(12) United States Patent
Kawai et al.

(10) Patent No.: US 8,136,015 B2
(45) Date of Patent: Mar. 13, 2012

(54) DATA STORAGE APPARATUS AND DATA STORAGE METHOD

(75) Inventors: Noboru Kawai, Nagoya (JP); Tadashi Arakawa, Nagoya (JP)

(73) Assignee: Buffalo Inc., Nagoya (JP)

( * ) Notice: Subject to any disclaimer, the term of this patent is extended or adjusted under 35 U.S.C. 154(b) by 789 days.

(21) Appl. No.: 12/300,906

(22) PCT Filed: May 14, 2007

(86) PCT No.: PCT/JP2007/060289
§ 371 (c)(1),
(2), (4) Date: Nov. 14, 2008

(87) PCT Pub. No.: WO2007/136018
PCT Pub. Date: Nov. 29, 2007

(65) Prior Publication Data
US 2009/0158124 A1   Jun. 18, 2009

(30) Foreign Application Priority Data
May 18, 2006   (JP) .................................. 2006-138780

(51) Int. Cl.
G06F 11/00   (2006.01)
(52) U.S. Cl. ....................................................... 714/763
(58) Field of Classification Search .................. 714/6.1, 714/763
See application file for complete search history.

(56) References Cited

U.S. PATENT DOCUMENTS
7,039,777 B2 * 5/2006 Yamagami et al. ........... 711/162
8,015,436 B2 * 9/2011 Winokur ...................... 714/6.12
2004/0090827 A1   5/2004 Dahlen et al.
2005/0122790 A1 * 6/2005 Ueno et al. ............... 365/189.05

FOREIGN PATENT DOCUMENTS
| JP | 8-16327 | 1/1996 |
| JP | 2000-207137 | 7/2000 |
| JP | 2004-139503 | 5/2004 |
| TW | I244587 | 12/2005 |
| WO | 03/029951 | 4/2003 |

OTHER PUBLICATIONS

International Search Report dated Jul. 10, 2007 for International Patent Application No. PCT/JP2007/060289.
Office Action from Chinese Application No. 200780018146.7 dated Apr. 1, 2007.
Office Action dated May 19, 2011 from Taiwanese Application No. 096117402.
Supplementary Search Report from European Application No. 07743724.2.
Japanese Notification of Reason for Rejection dated Nov. 30, 2010 from Japanese Patent Application No. 2006-138780.

* cited by examiner

Primary Examiner — Bryce Bonzo
(74) Attorney, Agent, or Firm — Beyer Law Group LLP

(57) ABSTRACT

In the ordinary operation mode, a data storage apparatus writes data into a first flash memory, while writing ECC data, which is used for correcting the data written in the first flash memory, into a second flash memory. When there is no remaining storage space in the first flash memory, the data storage apparatus deletes existing ECC data previously written in the second flash memory and writes ordinary data into the second flash memory. This arrangement enhances the reliability of data and enables effective use of the original storage space in the system of data storage with multiple storage areas.

17 Claims, 12 Drawing Sheets

INTERNAL MEMORY MAP IN DATA SECURITY MODE

INTERNAL MEMORY MAP IN SPACE PRIORITY MODE

DATA STORAGE APPARATUS AND DATA STORAGE METHOD

TECHNICAL FIELD

The present invention relates to a technique of storing data transferred from a host device, for example, a computer.

BACKGROUND ART

Various techniques have been proposed to enhance the reliability of data recorded by combination of multiple storage devices, such as a hard disk drive and a flash memory (see JP-A-2000-207137). For example, a technique called mirroring writes data of identical content into two physically or logically separate storage areas. Even in the event of some failure or trouble occurring in one of the storage areas, the system is continuously operable with the other storage area.

The mirroring technique writing data of the identical content into the two separate storage areas, however, undesirably halves the substantial storage space.

DISCLOSURE OF THE INVENTION

By taking into account this problem of the prior art, there would be a demand for improving the reliability of data and enabling effective use of the original storage space in a system of data storage with multiple storage areas.

In order to accomplish at least part of the demand mentioned above and other relevant demands, one aspect of the invention is directed to a data storage apparatus that stores data transferred from a host device. The data storage apparatus comprises: a first memory unit that has a predetermined storage area; a second memory unit that has a predetermined storage area; a monitoring unit that monitors at least a use area in the first memory unit; and a write control unit that, in response to detection of a remaining storage space in the storage area of the first memory unit by the monitoring unit, writes the data transferred from the host device into the first memory unit and writes correction data used for correction of the data into the second memory unit, and in response to detection of no remaining storage space in the storage area of the first memory unit by the monitoring unit, deletes existing correction data previously stored in the second memory unit and writes the data into the second memory unit.

When there is a remaining storage space in the storage area of the first memory, the data storage apparatus according to this aspect of the invention writes the data transferred from the host device into the first memory unit, while writing the corresponding correction data used for correcting the transferred data into the second memory unit. Even in the event of a damage of the data written in the first memory unit by any reason, the correction data written in the second memory unit is used to correct the damaged data.

When there is no remaining storage space in the storage area of the first memory, the data storage apparatus according to this aspect of the invention deletes the existing correction data previously written in the second memory unit and writes the data transferred from the host device into the second memory unit. This arrangement enables the effective use of the storage space in the first memory unit and the second memory unit. This provides the functional data storage apparatus by balancing the data reliability and the effective use of the storage space. The first memory unit and the second memory unit may be provided as physically separate two storage devices or may be provided by logically dividing the storage area in one storage device.

In one preferable application of the data storage apparatus according to the above aspect of the invention, the write control unit further comprises an encode unit that generates an error correction code, based on the data transferred from the host device, as the correction data.

The data storage apparatus of this application uses the error correction code stored in the second memory unit to readily correct the data stored in the first memory unit. The error correction code may be generated by any of various encoding techniques, for example, hamming encoding, cyclic encoding, or Reed-Solomon encoding. The error correction code is generally called ECC data.

In one preferable embodiment of the data storage apparatus of this application, the encode unit generates the error correction code having an equal number or a less number of bits to or than a number of bits of the data transferred from the host device.

The data storage apparatus of this embodiment may generate the error correction code having the same number of bits as the number of bits of the data transferred from the host device. The data length of the data transferred from the host device is accordingly equal to the data length of the corresponding correction data generated from the transferred data. This arrangement enables the data and the corresponding correction data to be stored at identical addresses in the first memory unit and the second memory unit, thus facilitating address management. The data storage apparatus of this embodiment may alternatively generate the error correction code having the less number of bits than the number of bits of the data transferred from the host device. This arrangement desirably reduces the capacity of the correction data stored in the second memory unit.

In another preferable application of the data storage apparatus according to the above aspect of the invention, the write control unit generates either identical data with the data transferred from the host device or inverse data having inverted bits to bits of the data transferred from the host device, as the correction data.

The data storage apparatus of this application generates either the identical data with the data transferred from the host device or the inverse data having the inverted bits to the bits of the data transferred from the host device, as the correction data. This arrangement facilitates generation of the correction data and desirably relieves the processing load. Error check in the data reading process only requires the simple comparison between the data transferred from the host device and such correction data. This relieves the processing load and prevents a decrease in processing speed.

In still another preferable application of the data storage apparatus according to the above aspect of the invention, the write control unit writes the data transferred from the host device into the second memory unit according to a virtual address space, which is provided by connecting a physical last address of the first memory unit with a physical last address of the second memory unit.

In the operating status of writing the ordinary data into the second memory unit, the data storage apparatus of this application enables address specification in a seamless manner without discriminating the storage area of the first memory unit from the storage area of the second memory unit.

In one preferable embodiment according to the above aspect of the invention, the data storage apparatus further comprises a read control unit that, in response to a data read request from the host device, when a storage location of target data as an object of the data read request is the first memory unit and corresponding correction data generated from the target data is present in the second memory unit, reads the target data from the first memory unit and the corresponding correction data from the second memory unit, corrects the target data with the corresponding correction data, and transfers the corrected target data to the host device.

The data storage apparatus of this embodiment performs error check and correction of the target data as the object of the data read request, based on the data stored in the first memory unit and the correction data stored in the second memory unit. This arrangement desirably enhances the reliability of data.

In one preferable application of the data storage apparatus of the above embodiment, when the storage location of the target data as the object of the data read request is the first memory unit and the corresponding correction data generated from the target data is not present in the second memory unit, the read control unit reads the target data from the first memory unit and directly transfers the read target data to the host device.

Even when the correction data stored in the second memory unit has already been deleted, the data storage apparatus of this application enables data to be adequately read from the first memory unit and to be transferred to the host device.

In another preferable application of the data storage apparatus of the above embodiment, when the storage location of the target data as the object of the data read request is a storage area for ordinary data in the second memory unit, the read control unit reads the target data from the second memory unit and directly transfers the read target data to the host device.

In the operating status of writing the ordinary data into the second memory unit, the data storage apparatus of this application enables data to be adequately read from the second memory unit and to be transferred to the host device.

In still another preferable application of the data storage apparatus of the above embodiment, when the storage location of the target data as the object of the data read request is a storage area for the correction data in the second memory unit, the read control unit transfers prescribed data as dummy data to the host device without reading data from the second memory unit.

In the operating status of writing the ordinary data into the second memory unit, the storage area for the correction data in the second memory unit is originally recognized as a vacant space by the host device. The transfer of the specified data as the dummy data to the host device causes the host device to recognize the data read from the storage area for the correction data as invalid data. The dummy data may be, for example, '00', 'FF', '55', or 'AA' in hexadecimal notation.

In one preferable application of the data storage apparatus according to the above aspect of the invention, the write control unit stores an address pointer representing a maximum address for writing the data, when the data transferred from the host device is written into the second memory unit. The read control unit refers to the address pointer and determines whether correction data corresponding to the target data as the object of the data read request is present in the second memory unit or whether the storage location of the target data as the object of the data read request is a storage area for the correction data in the second memory unit.

The data storage apparatus of this application uses the address pointer to clearly discriminate a storage area for ordinary data from a storage area for correction data in the second memory unit. The use of the address pointer facilitates the determination of whether correction data corresponding to the target data as the object of the data read request is present in the second memory unit or the determination of whether the storage location of the target data as the object of the data read request is the storage area for the correction data in the second memory unit.

In another preferable application of the data storage apparatus according to the above aspect of the invention, the write control unit stores a prescribed table representing a data writing status at each address in the second memory unit, when the data transferred from the host device is written into the second memory unit. The read control unit refers to the stored table and determines whether correction data corresponding to the target data as the object of the data read request is present in the second memory unit or whether the storage location of the target data as the object of the data read request is a storage area for the correction data in the second memory unit.

The data storage apparatus of this application uses the prescribed table representing the data writing status at each address in the second memory unit to facilitate the determination.

In one preferable embodiment of the invention, the data storage apparatus having any of the above arrangements further comprises a unit that inhibits the write control unit from writing ordinary data into the second memory unit in response to a predetermined setting operation, whether there is a remaining storage space or no remaining storage space in the storage area of the first memory unit.

The data storage apparatus of this arrangement enables the writing operation of the ordinary data into the second memory unit to be arbitrarily restricted, thus improving the user's convenience. The predetermined setting operation may be an operation of a physical switch provided on the data storage apparatus or an operation by an application program working on the host device connected with the data storage apparatus.

In the data storage apparatus having any of the above arrangements, it is preferable that the first memory unit and the second memory unit have identical storage spaces.

This application enables one-to-one address mapping between the first memory unit and the second memory unit for storage of the data and the corresponding correction data, thus ensuring easy address management. This application also enables identical types of storage units to be adopted for the first memory unit and the second memory unit, thus desirably reducing the manufacturing cost. It is, however, not essential to make the storage space of the first memory unit equal to the storage space of the second memory unit. The second memory unit may be designed to have a larger storage space than that of the first memory unit. When the correction data has a shorter data length than the data length of the data transferred from the host device, the second memory unit may be designed to have a smaller storage space than that of the first memory unit.

In the data storage apparatus having any of the above arrangements, it is preferable that the data is transferred from the host device via a USB interface.

The data storage apparatus of the present invention is readily usable by simply connecting the data storage apparatus to a USB port provided in the host device, such as a computer. This arrangement desirably improves the user's convenience.

In the data storage apparatus having any of the above arrangements, each of the first memory unit and the second memory unit may be a non-volatile semiconductor memory. Typical examples of the non-volatile semiconductor memory include a NAND flash memory, a NOR flash memory, an EEPROM, and a battery backed-up DRAM.

The use of the non-volatile semiconductor memories actualizes a highly portable small-sized data storage apparatus. Each of the first memory unit and the second memory unit is not restricted to the semiconductor memory but may be a hard disk drive or a rewritable optical disk. Different types of storage units may be adopted for the first memory unit and the second memory unit.

The technique of the invention is not restricted to the data storage apparatus having any of the arrangements described above but is also actualized by a data storage method.

According to another aspect, the present invention is directed to a data storage method of storing data transferred from a host device into a data storage apparatus, which is equipped with a first memory unit that has a predetermined storage area and a second memory unit that has a predetermined storage area. The data storage method monitors at least a use area in the first memory unit. In response to detection of a remaining storage space in the storage area of the first memory unit as a result of the monitoring, the data storage method writes the data transferred from the host device into the first memory unit and writes correction data used for correction of the data into the second memory unit. In response to detection of no remaining storage space in the storage area of the first memory unit as a result of the monitoring, the data storage method deletes existing correction data previously stored in the second memory unit and writes the data into the second memory unit.

The data storage method according to this aspect of the invention has the similar effects to those described above.

BEST MODES OF CARRYING OUT THE INVENTION

Figure 1:
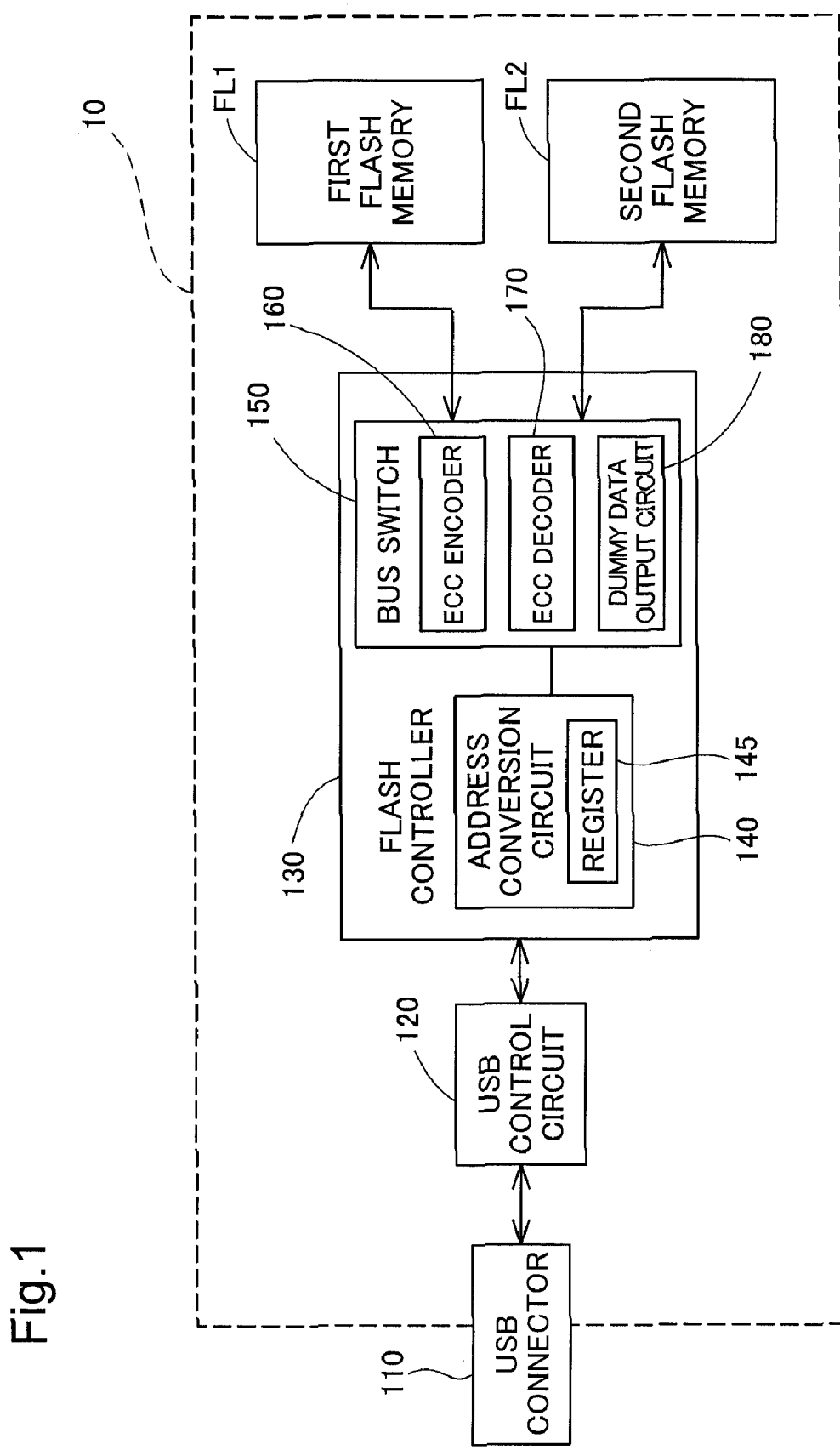
FIG. 1 is an explanatory view showing the schematic configuration of a data storage apparatus.

In order to elucidate the functions, the advantages, and the effects of the invention, one mode of carrying out the invention is described below in the following sequence as a preferred embodiment:

A. General Configuration of Data Storage Apparatus
B. Outline of Operations of Data Storage Apparatus
C. Processing Details
  (C1) Main Process
  (C2) Pointer Setting Process
  (C3) Write Processes
  (C4) Read Process
D. Effects
E. Modifications A. General Configuration of Data Storage Apparatus FIG. 1 is an explanatory view showing the schematic configuration of a data storage apparatus 10 in one embodiment. As illustrated, the data storage apparatus 10 of the embodiment internally has two flash memories (a first flash memory FL1 and a second flash memory FL2). Each of these flash memories may be, for example, a NAND flash memory or a NOR flash memory.

In the ordinary operating status, the data storage apparatus 10 writes data into the first flash memory FL1, while writing ECC data, which is used for correction of the data written in the first flash memory FL1, into the second flash memory FL2. This operating status is hereafter referred to as a 'data security mode'. When the remaining storage space in the first flash memory FL1 decreases to 0, the data storage apparatus 10 deletes the existing ECC data previously written in the second flash memory FL2 and writes the ordinary data into the second flash memory FL2. This operating status is hereafter referred to as a 'space priority mode'.

As illustrated in FIG. 1, the data storage apparatus 10 of the embodiment includes a USB connector 110, a USB control circuit 120, and a flash controller 130, as well as the first flash memory FL1 and the second flash memory FL2.

The USB connector 110 is exposed on a casing of the data storage apparatus 10 (expressed by a broken line rectangle in the drawing) and is connected to a USB interface provided in a host device, such as a personal computer or a printer (hereafter simply referred to as the 'host').

The USB control circuit 120 is connected with the USB connector 110 and with the flash controller 130. The USB control circuit 120 causes the data storage apparatus 10 to work as a USB mass storage class device and controls communication of the data storage apparatus 10 with the host according to a USB protocol. The USB control circuit 120 also has the functions of converting a USB command received from the host into an ATA command or an SCSI command and converting a status signal or data received from the flash controller 130 into a USB command. The ATA command is a standardized command by ANSI (American National Standard Institute) and has the general versatility to control data reading and data writing from and to not only the data storage apparatus 10 of the embodiment but diversity of other data storage apparatuses including a hard disk and a PC card memory. The SCSI command has the higher versatility than the ATA command and is capable of controlling a scanner, as well as the data storage apparatus like the hard disk.

The flash controller 130 is an integrated circuit constructed to interpret the ATA command (or the SCSI command) transferred from the USB control circuit 120 and to control data reading and data writing from and to the first flash memory FL1 and the second flash memory FL2 connected via a bus switch 150. The flash controller 130 internally has a CPU, a ROM, and a RAM for such control. A program for controlling the operations of the data storage apparatus 10 is recorded in the ROM. The CPU uses the RAM as a work area and executes the recorded program to control the general operations of the data storage apparatus 10.

The flash controller 130 has an address conversion circuit 140 and the bus switch 150. The address conversion circuit 140 converts virtual addresses enabling sequential accesses to data storage areas in the two flash memories into real addresses in the first flash memory FL1 or the second flash memory FL2. The values of address pointers stored in a register 145 are used for such address conversion. As mentioned above, the data storage apparatus 10 of the embodiment has the two different operation modes, the data security mode and the space priority mode. In the space priority mode, the ordinary data is written into the second flash memory FL2. The flash controller 130 uses the virtual addresses enabling sequential accesses to the data storage areas in the two flash memories. The address conversion circuit 140 converts the virtual addresses into real addresses in each flash memory. The flash controller 130 can thus read and write data without considering the type of the flash memory.

The bus switch 150 is connected with the flash controller 130, the first flash memory FL1, and the second flash memory FL2. The bus switch 150 switches over a data input source or a data output destination between the two flash memories FL1 and FL2, based on a command (write command or a read command) output from the flash controller 130 and an address of the flash memory to be accessed. The bus switch 150 internally has an ECC encoder 160, an ECC decoder 170, and a dummy data output circuit 180.

The ECC encoder 160 is a circuit designed to hamming code data as an object of a write command given by the host and thereby generate ECC data in the data security mode. The generated ECC data is written into the second flash memory FL2. In the structure of the embodiment, 1-byte ECC data is generated from 1-byte data. The ECC data may be generated by another coding technique, for example, cyclic coding or Reed-Solomon coding, instead of hamming coding.

The ECC decoder 170 is a circuit designed to decode the ECC data read from the second flash memory FL2 based on the ordinary data read from the first flash memory FL1 and perform error check and correction of the read ordinary data in the data security mode or in the space priority mode.

The dummy data output circuit 180 is designed to output dummy data (for example, '00') in the space priority mode when the host reads data from a data storage area of the ECC data in the second flash memory FL2 (more precisely, ECC data to be used for correcting the ordinary data recorded in the first flash memory FL1). The operations of the dummy data output circuit 180 will be described later in detail.

The bus switch 150 changes over the connection of the ECC encoder 160, the ECC decoder 170, and the dummy data output circuit 180 with the first flash memory FL1 or with the second flash memory FL2 according to the operating status of the data storage apparatus 10. The changeover of the connection will be mentioned in the subsequent explanation of various processes.

B. Outline of Operations of Data Storage Apparatus

Figure 2:
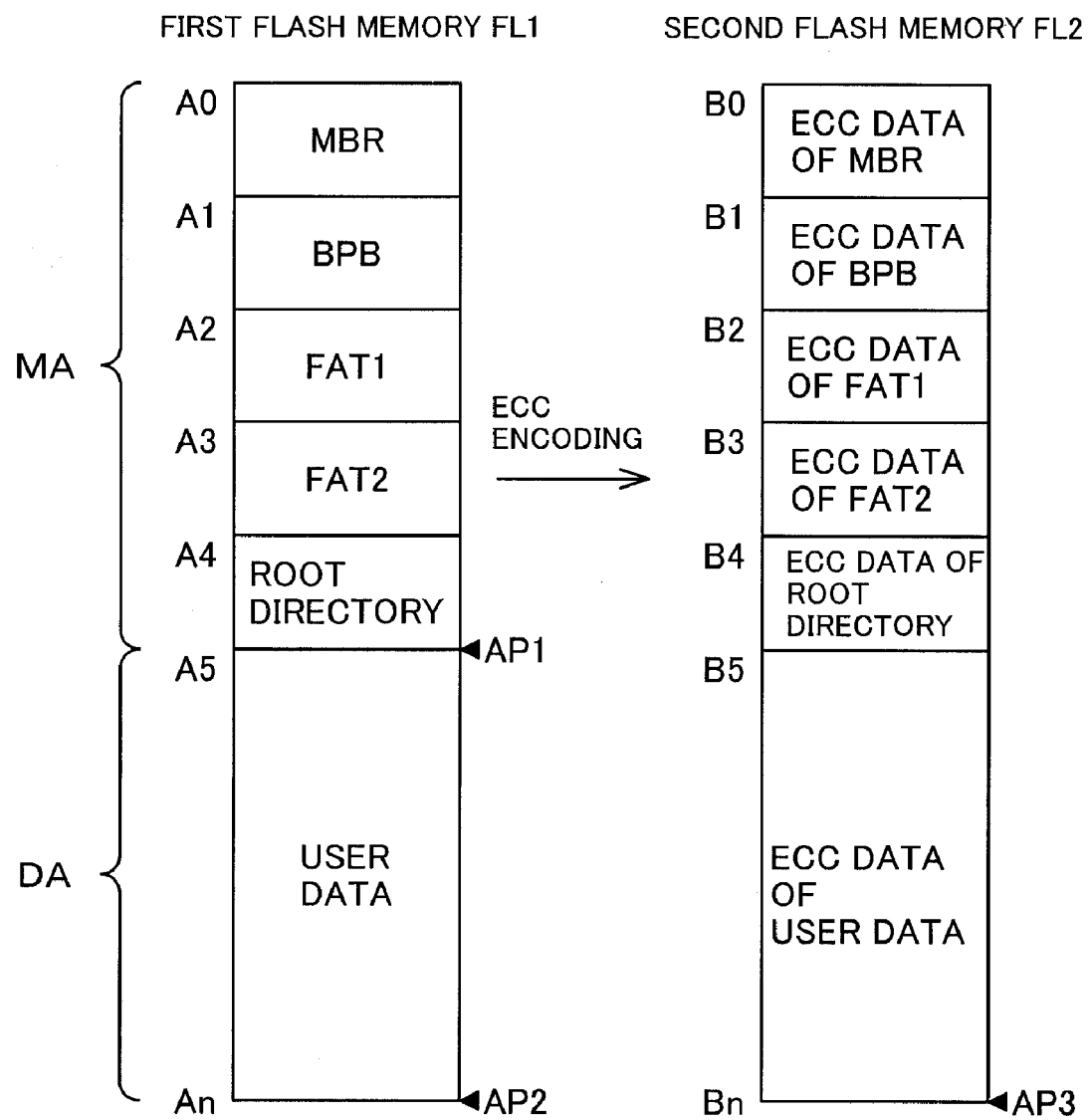
FIG. 2 is an explanatory view showing an internal memory map of the data storage apparatus in a data security mode.

FIG. 2 is an explanatory view showing an internal memory map of the data storage apparatus 10 in the data security mode. The left drawing shows the first flash memory FL1 formatted according to an FAT file system to have one partition.

Formatting according to the FAT file system divides the memory area of the first flash memory FL1 into a management area MA and a user data area DA. The management area MA includes a master boot record area (hereafter referred to as 'MBR area'), a bios parameter block area (hereafter referred to as 'BPB area'), an FAT1 area, an FAT2 area, and a root directory area. Since the FAT data structure is known in the art, the respective areas are explained only briefly.

The MBR area is read first on connection of the data storage apparatus 10 with the host. Pieces of information including a bootstrap code and a partition table are recorded as the master boot record. The partition table stores relevant pieces of information, for example, the number of generated partitions, a starting sector and an end sector of each partition, offsets, and the total number of sectors.

The BPB area is provided in a head sector of each partition and stores various pieces of information including a format type of the partition, the number of sectors in the partition, and the number of file allocation tables or FAT.

Each of the FAT1 area and the FAT2 area stores cluster chain information on cluster chains of the files recorded in the user data area DA. Identical information is recorded in the FAT1 area and the FAT2 area.

The root directory area stores the file name, the extension, and the attribute of each file on the root, as well as a cluster number of a first cluster as a constituent of the file.

As shown in the right drawing of FIG. 2, in the data security mode, the ECC data generated by the ECC encoder 160 from the data written in the first flash memory FL1 is recorded in the second flash memory FL2. As mentioned previously, the 1-byte ECC data is generated from the 1-byte data in this embodiment. There is accordingly one-to-one address mapping between the first flash memory FL1 and the second flash memory FL2. Namely the ECC data corresponding to the data recorded at a certain address in the first flash memory FL1 is recorded at a corresponding address in the second flash memory FL2.

In the data security mode, in response to a data write command given by the host, the data storage apparatus 10 writes data as a writing object at a specific address in the order of the upper address to the lower address in the user data area DA of the first flash memory FL1, as long as there is any remaining storage space in the user data area DA of the first flash memory FL1. The ECC data generated from the data as the writing object is written at a corresponding address in the second flash memory FL2. In response to a data read command given by the host, on the other hand, the data storage apparatus 10 reads out data from a specified address in the first flash memory FL1, while reading out ECC data from a corresponding address in the second flash memory FL2. The ECC decoder 170 then performs error check and data correction, based on the ECC data.

Figure 3:
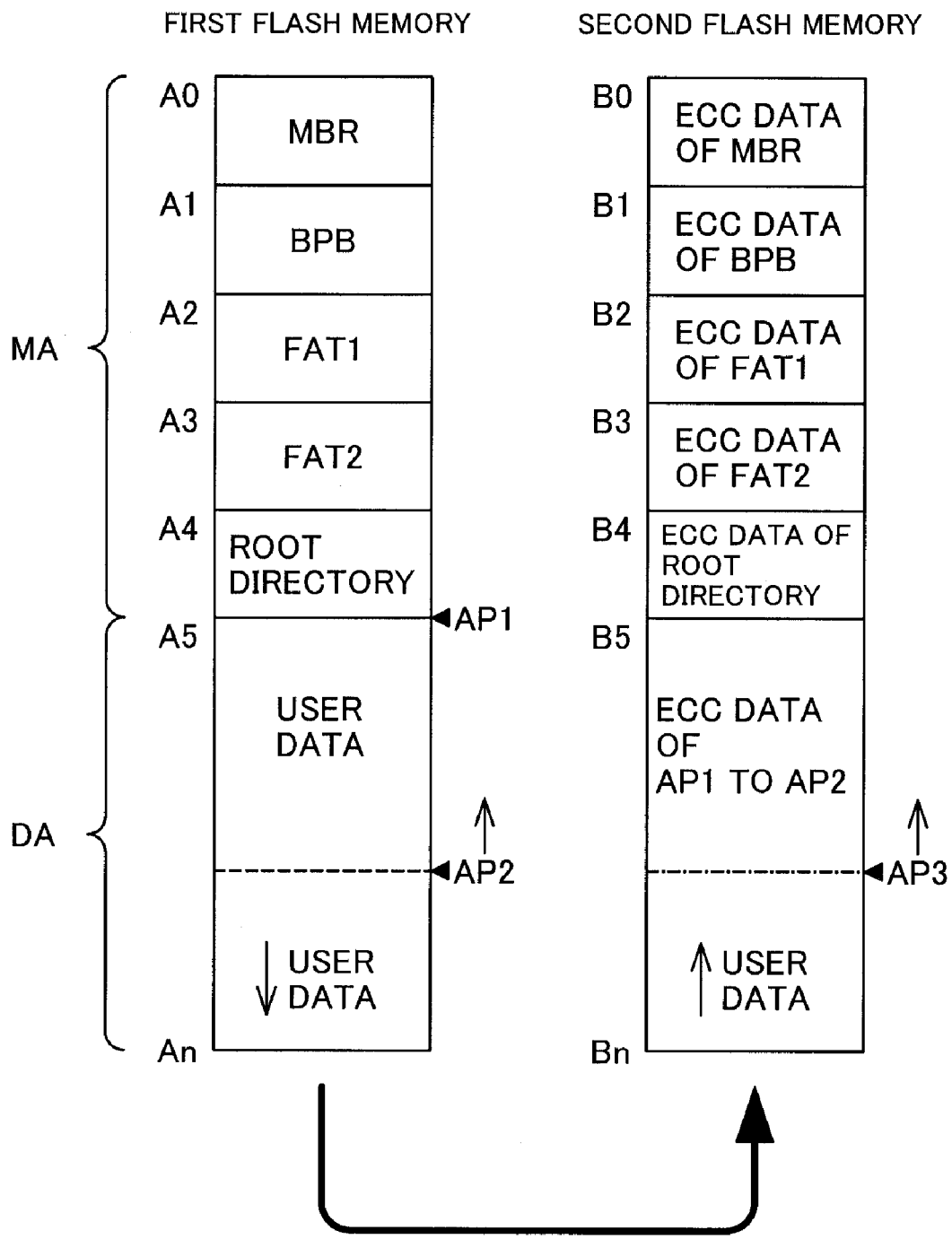
FIG. 3 is an explanatory view showing an internal memory map of the data storage apparatus in a space priority mode.

FIG. 3 is an explanatory view showing an internal memory map of the data storage apparatus 10 in the space priority mode. As illustrated, the operating status of the data storage apparatus 10 is changed from the data security mode to the space priority mode when there is no remaining storage space in the user data area DA of the first flash memory FL1. The data storage apparatus 10 then writes data as an object of a write command given by the host inversely from a last address Bn into the user data area DA of the second flash memory FL2. When there is ECC data at the writing destination, the data storage apparatus 10 deletes and overwrites the existing ECC data with the ordinary data as the writing object. In the space priority mode, the data storage apparatus 10 does not generate ECC data.

During the operation of the data storage apparatus 10 in the space priority mode, the user data area DA of the second flash memory FL2 includes a storage area for ECC data previously written in the data security mode and a storage area for ordinary data written after the changeover of the operating status to the space priority mode. With a view to discriminating the boundary between these two storage areas, the data storage apparatus 10 provides and stores an address pointer AP3 representing an address on the boundary in the register 145.

The address pointer AP3 shifts from the last address Bn of the second flash memory FL2 toward a head address B5 of the user data area DA in the second flash memory FL2, as data is sequentially written into the second flash memory FL2.

In the space priority mode, when data is read from a specific area in the first flash memory FL1 corresponding to the storage area for the existing ECC data in the second flash memory FL2, the data storage apparatus 10 can perform error check and data correction based on the ECC data in the same manner as in the data security mode. With a view to discriminating the specific area in the first flash memory FL1, the data storage apparatus 10 sets an address in the first flash memory FL1 corresponding to the address pointer AP3 in the second flash memory FL2 to an address pointer AP2 and stores the address pointer AP2 in the register 145. The address pointer AP2 shifts from a last address An of the first flash memory FL1 toward a head address A5 of the user data area DA in the first flash memory FL1, as data is sequentially written into the second flash memory FL2.

The flash controller 130 refers to this address pointer AP2 and determines whether there is still any remaining storage space in the first flash memory FL1. The flash controller 130 monitors the address pointer AP2 and determines that there is a remaining storage space in the first flash memory FL1, when the address pointer AP2 represents the last address An of the first flash memory FL1. In this case, the flash controller 130 writes data into the first flash memory FL1. When the address pointer AP2 represents an address lower than the last address An, on the other hand, the flash controller 130 determines that there is no remaining storage space in the first flash memory FL1. In this case, the flash controller 130 writes data into the second flash memory FL2.

With a view to discriminating the boundary between the management area MA and the user data area DA in the first flash memory FL1, the data storage apparatus 10 provides and stores an address pointer AP1 representing an address on the boundary in the register 145. A write process and a read process described later use these address pointers AP1 through AP3 to specify the flash memory as a data read source or a data write destination and to identify generation or no generation of ECC data.

Figure 4:
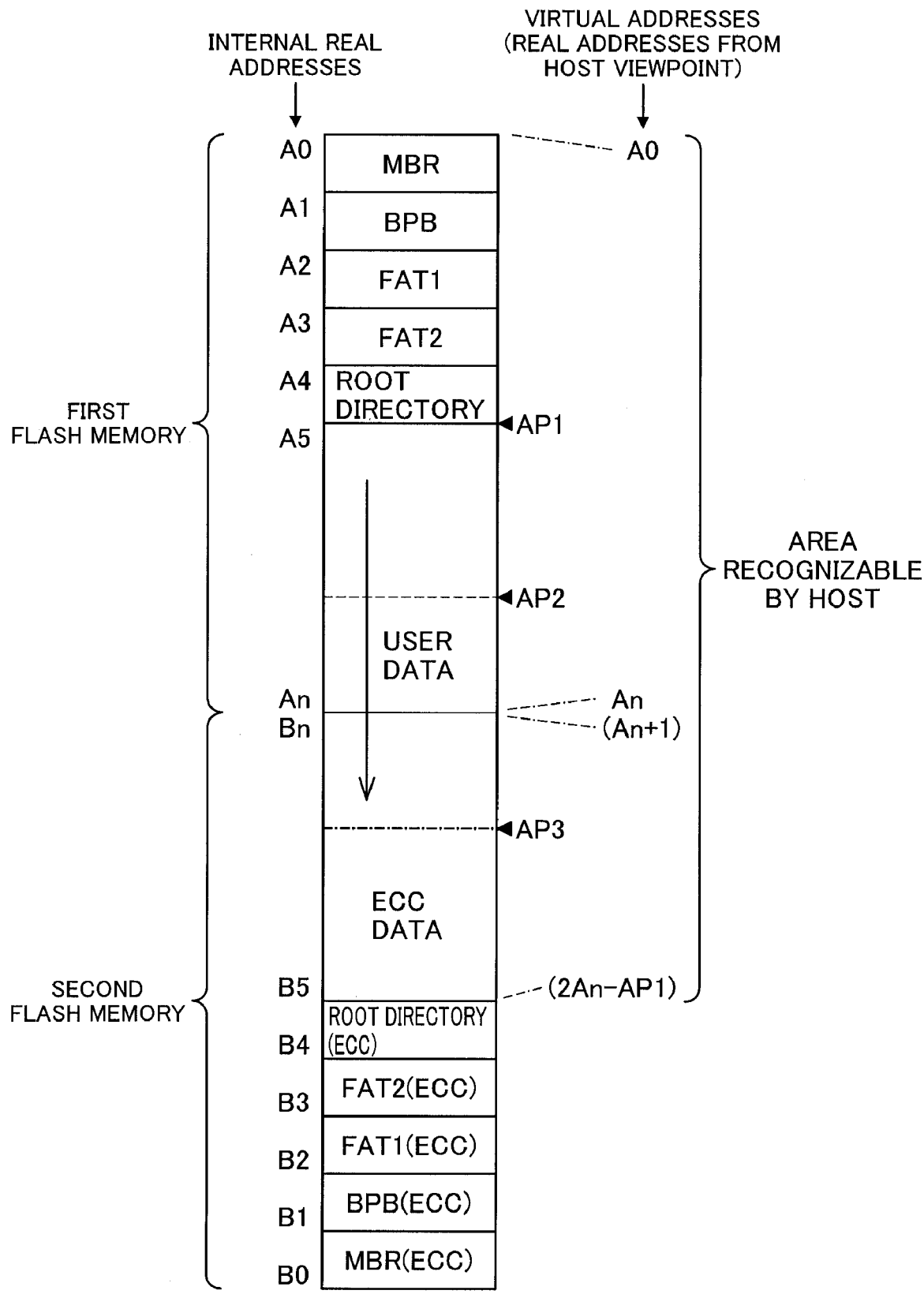
FIG. 4 is an explanatory view showing virtual addresses used by a flash controller and an address space recognizable by a host.

FIG. 4 is an explanatory view showing virtual addresses used by the flash controller 130 and an address space recognizable by the host. As illustrated, in response to a changeover of the operating status of the data storage apparatus 10 to the space priority mode, the last real address An of the first flash memory FL1 and the last real address Bn of the second flash memory FL2 are interconnected to form one virtual storage area. Since the last real address of the first flash memory FL1 is 'An', the last real address Bn of the second flash memory FL2 corresponds to a virtual address 'An+1'. The first flash memory FL1 and the second flash memory FL2 have identical storage capacities. The head real address B5 of the user data area DA in the second flash memory FL2 accordingly corresponds to a virtual address '2An-AP1'. In the space priority mode, the function of the address conversion circuit 140 causes the host to recognize a virtual address 'A0' to the virtual address '2An-AP1' as the real addresses of the data storage apparatus 10. This sequential area is thus made accessible in a seamless manner. The virtual addresses A0 to An are identical with the real addresses A0 to An of the first flash memory FL1.

C. Processing Details (C1) Main Process

Figure 5:
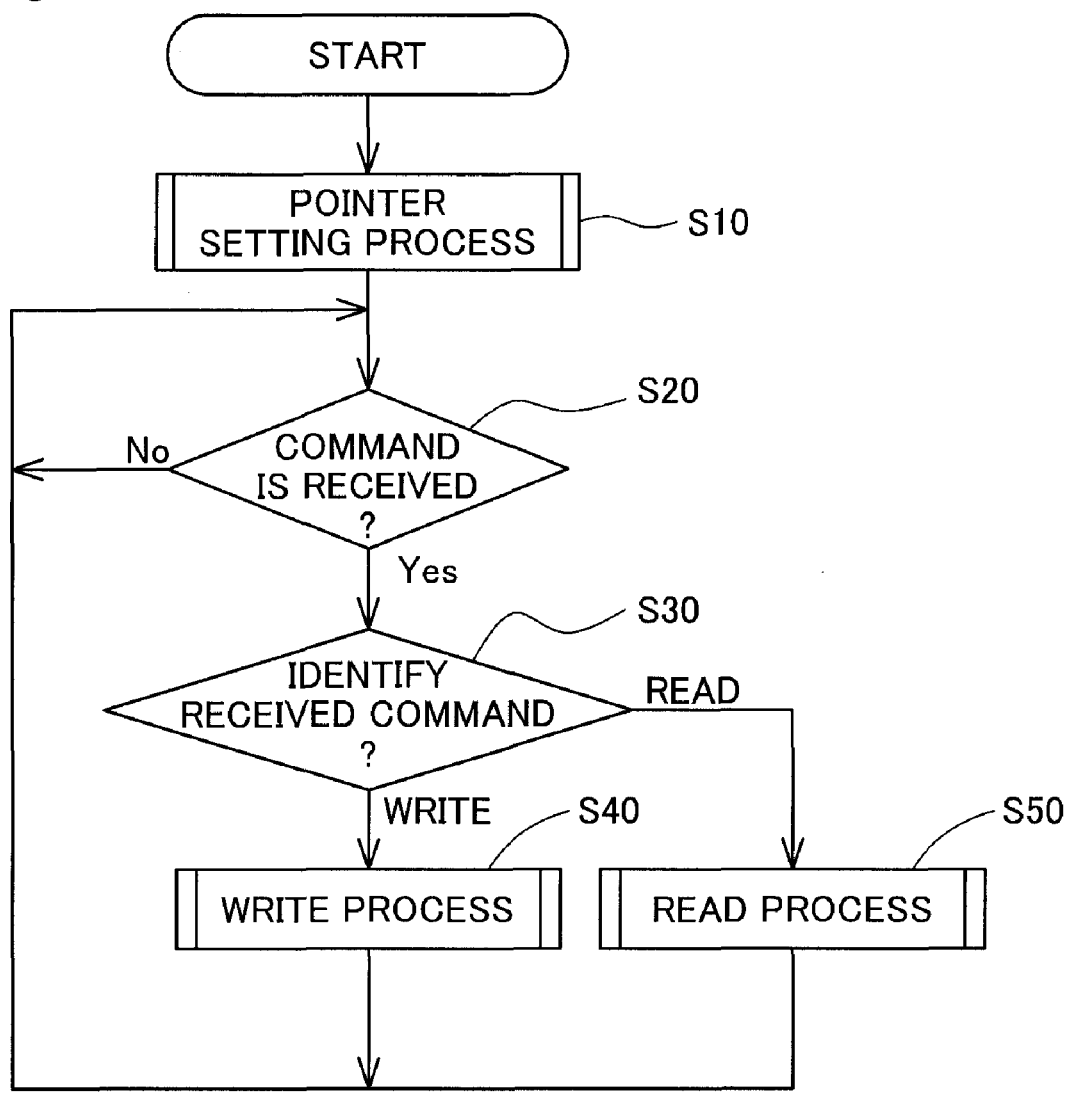
FIG. 5 is a flowchart showing a main process routine.

FIG. 5 is a flowchart showing a main process routine executed by the data storage apparatus 10. The flash controller 130 starts this main process flow simultaneously with connection of the data storage apparatus 10 to the host and start of power supply to the data storage apparatus 10.

At the start of the main process flow, the flash controller 130 performs a pointer setting process to set the values of the address pointers AP1 to AP3, based on the locations of the data previously stored in the two flash memories (step S10). The details of the pointer setting process will be explained later.

The flash controller 130 subsequently determines whether any command is received from the host via the USB connector 110 and the USB control circuit 120 (step S20). When no command is received (step S20: no), the flash controller 130 repeats this decision step to wait for reception of any command. When any command is received (step S20: yes), on the other hand, the flash controller 130 identifies the received command (step S30).

When the received command is identified as a write command for writing data (step S30: 'write'), the flash controller 130 performs a write process described later (step S40). When the received command is identified as a read command for reading data (step S30: 'read'), on the other hand, the flash controller 230 performs a read process described later (step S50). On completion of either the write process or the read process, the main process flow goes back to step S20. The main process repeats the series of processing in response to a command received from the host until cutoff of the power supply.

(C2) Pointer Setting Process

Figure 6:
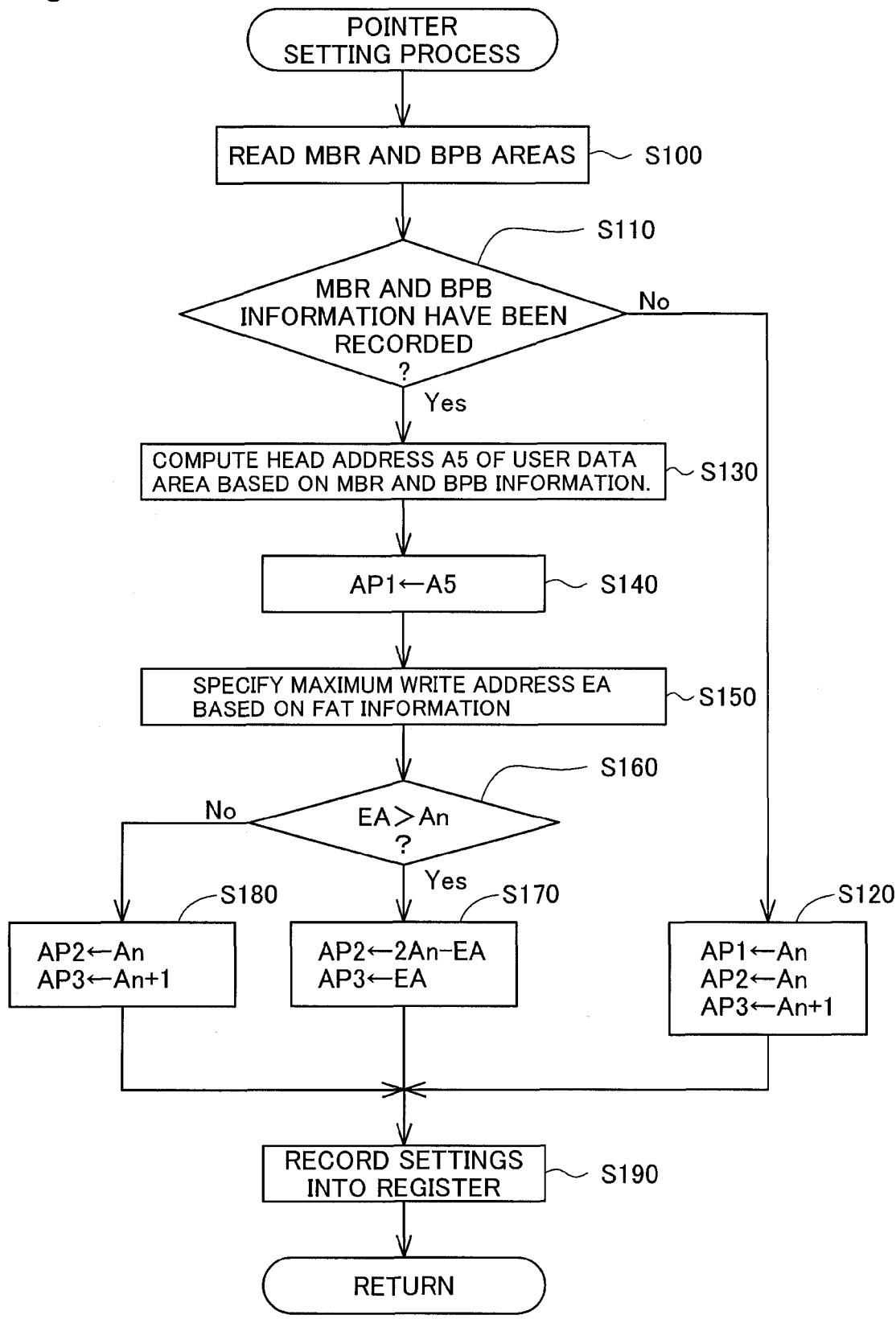
FIG. 6 is a flowchart showing a pointer setting process.

FIG. 6 is a flowchart showing the pointer setting process executed at step S10 in the main process routine explained above. The pointer setting process is performed to specify the initial values of the address pointers, based on the locations of the data previously stored in the two flash memories. In the description below, the 'address' represents a virtual address shown in FIG. 4, unless otherwise specified.

In the pointer setting process, the flash controller 130 first reads the MBR area and the BPB area in the first flash memory FL1 (step S100) and determines whether the MBR information and the BPB information have already been written in the MBR area and in the BPB area (step S110).

Upon determination that the MBR information and the BPB information have not yet been written (step S110: no), it means that the data storage apparatus 10 has not yet been formatted. The flash controller 130 accordingly sets the values of the address pointers AP1 to AP3 by the following procedure. The flash controller 130 sets an address An representing a physical last address of the first flash memory FL1 to the values of the address pointers AP1 and AP2, while setting an address (An+1) representing a physical last address of the second flash memory FL2 to the value of the address pointer AP3. In the unformatted condition of the data storage apparatus 10, the pointer setting process is terminated after setting the values of the address pointers AP1 to AP3 in this manner.

Upon determination that the MBR information and the BPB information have already been written respectively in the MBR area and in the BPB area (step S110: yes), on the other hand, the flash controller 130 computes a head address A5 of the user data area DA based on the information recorded in the MBR area and the BPB area, for example, the partition table and the number of sectors (step S130). The flash controller 130 then sets the computed address 'A5' to the value of the address pointer AP1 (step S140).

The flash controller 130 subsequently analyzes the information recorded in the FAT area and specifies a maximum address of the data previously written in the user data area DA (hereafter referred to as 'maximum write address EA') (step S150). Cluster chain information on cluster chains of the files recorded in the user data area DA is recorded in the FAT area. Tracing the cluster chains of all the files specifies the maximum write address EA. Identical information is recorded in the FAT1 area and in the FAT2 area, so that the object of analysis may be either the information recorded in the FAT1 area or the information recorded in the FAT2 area.

After specifying the maximum write address EA, the flash controller 130 compares the specified maximum write address EA with the last address An of the first flash memory FL1 and determines whether the maximum write address EA exceeds the address An (step S160). When the maximum write address EA exceeds the address An (step S160: yes), it means that the second flash memory FL2 has the existing storage of user data and that the selected operating status is the space priority mode (see FIG. 4). The flash controller 130 accordingly sets the values of the address pointers AP2 and AP3 by the following procedure. The flash controller 130 sets the maximum write address EA to the value of the address pointer AP3, while setting an address (2An-EA), as a result of subtraction of the maximum write address EA from a 2-fold value of the address An, to the value of the address pointer AP2 (step S170). The address pointer AP2 and the address pointer AP3 accordingly indicate identical real addresses in the first flash memory FL1 and in the second flash memory FL2 (see FIGS. 3 and 4).

When the maximum write address EA is less than or equal to the address An (step S160: no), it means that the first flash memory FL1 still has a remaining storage space in the user data area DA and that the selected operating status is the data security mode. The flash controller 130 accordingly sets the address An to the value of the address pointer AP2, while setting the address (An+1) to the value of the address pointer AP3 (step S180) (see FIG. 2).

After setting the values of the address pointers AP1 to AP3 in the above manner, the flash controller 130 records the settings of the address pointers AP1 to AP3 into the register 145 (step S190). The flash controller 130 then terminates the series of pointer setting process and goes back to the main process flow.

(C3) Write Process

Figure 7:
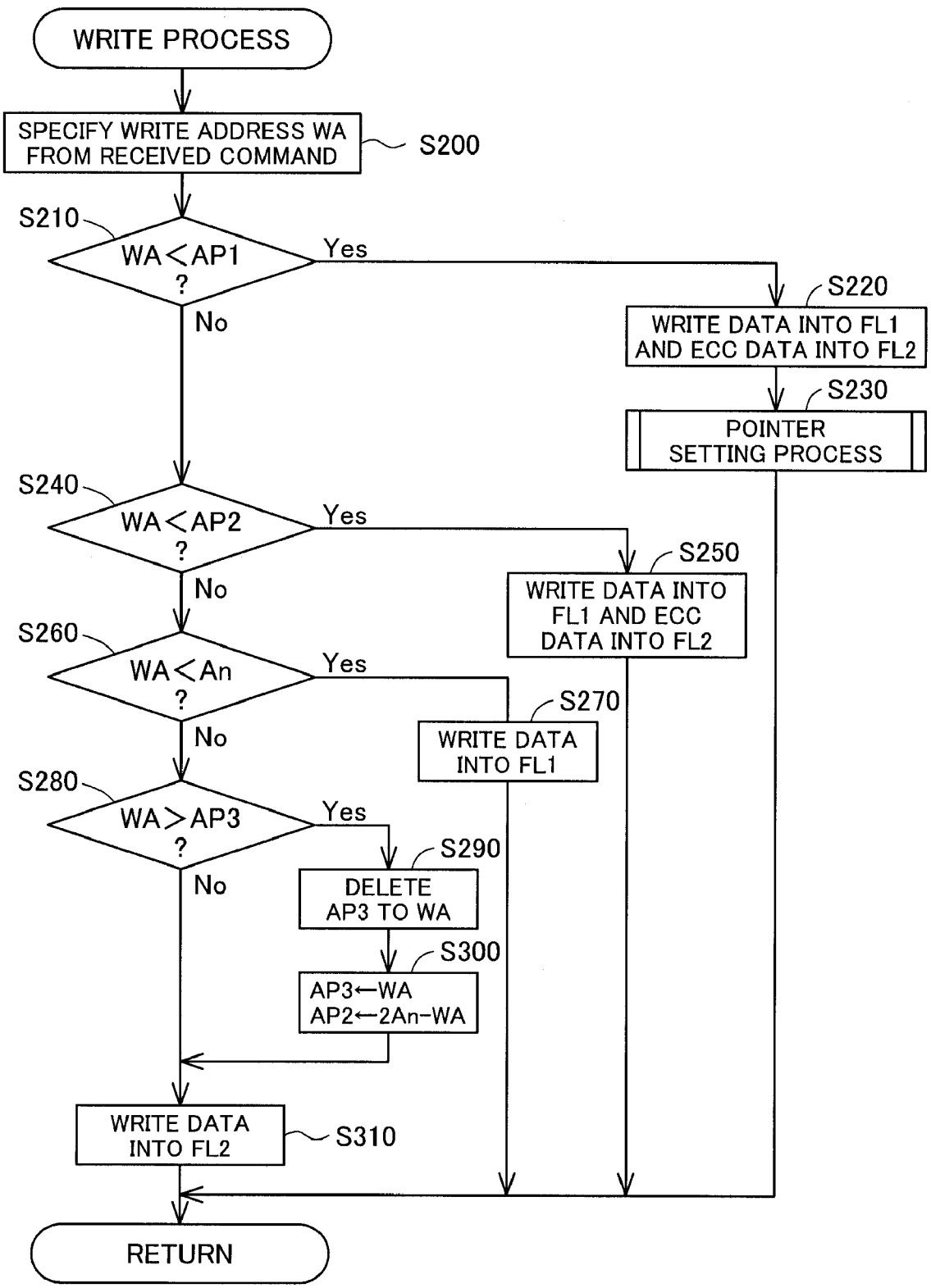
FIG. 7 is a flowchart showing a write process.

FIG. 7 is a flowchart showing the details of the write process executed at step S40 in the main process routine explained above. The write process is performed to write data received from the host into the flash memory.

In the write process, the flash controller 130 first analyzes a write command received from the host via the USB control circuit 120 and specifies an address of a writing destination (hereafter referred to as 'write address WA') (step S200).

The flash controller 130 subsequently refers to the storage in the register 145 and determines whether the specified write address WA is lower than the address indicated by the address pointer AP1 (step S210). Upon determination that the write address WA is lower than the address indicated by the address pointer AP1 (step 210: yes), it is determinable that the command received from the host is a write command into the management area MA of the first flash memory FL1 (see FIGS. 3 and 4). The flash controller 130 accordingly writes the writing data at the write address WA in the first flash memory FL1 and writes ECC data generated from the writing data at a corresponding real address WA (one of the real addresses B0 to B5 in FIG. 3) in the second flash memory FL2 (step S220).

Figure 8:
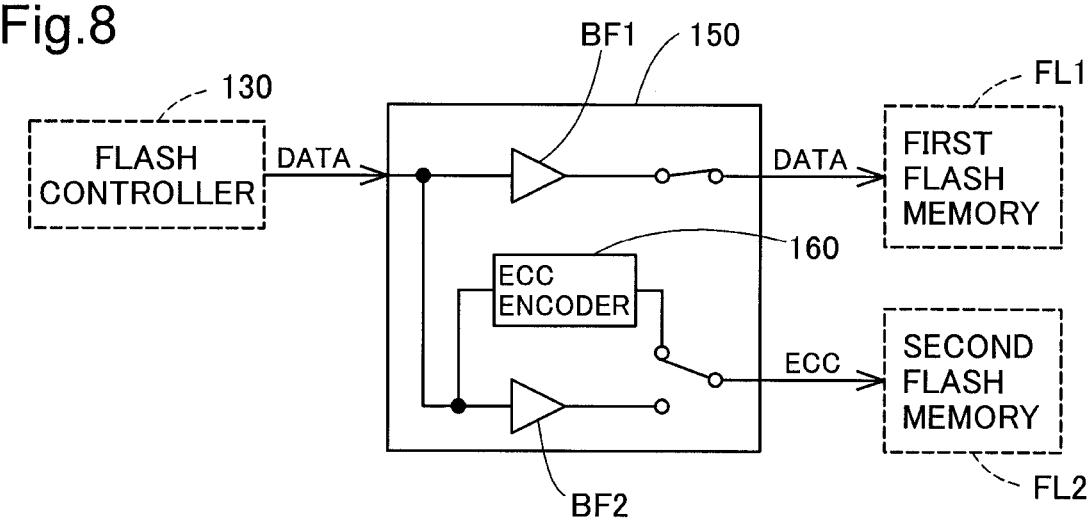
FIG. 8 is an explanatory view showing an internal structure of a bus switch.

FIG. 8 is an explanatory view showing the internal structure of the bus switch 150 in the state of data writing at step S220. In this state, the bus switch 150 connects the flash controller 130 separately with an internal buffer BF1 and with the ECC encoder 160, while connecting the buffer BF1 with the first flash memory FL1 and connecting the ECC encoder 160 with the second flash memory FL2. This internal structure of the bus switch 150 enables the writing data to be output to the first flash memory FL1 and the ECC data generated from the writing data to be output to the second flash memory FL2.

On completion of the writing data and the ECC data into the management area MA at step S220, the flash controller 130 executes the pointer setting process explained previously with reference to FIG. 6 (step S230). The values of the address pointers AP1 to AP3 can thus be set adequately on completion of formatting the data storage apparatus 10, as well as immediately after the power supply to the data storage apparatus 10.

Upon determination that the write address WA is higher than the address indicated by the address pointer AP1 (step S210: no), on the other hand, the flash controller 130 refers to the storage in the register 145 and determines whether the write address WA is lower than the address indicated by the address pointer AP2 (step S240). Upon determination that the write address WA is lower than the address indicated by the address pointer AP2 (step S240: yes), it means that the write address WA is located in a range between the address indicated by the address pointer AP1 and the address indicated by the address pointer AP2. In this state, whether the operating status of the data storage apparatus 10 is the data security mode or the space priority mode, ECC data is written at a corresponding address in the second flash memory FL2 corresponding to the write address WA in the first flash memory FL1 (see FIGS. 2 and 3). The flash controller 130 accordingly writes the writing data at the write address WA in the first flash memory FL1 and writes ECC data generated from the writing data at the corresponding address WA (real address) in the second flash memory FL2 (step S250). The internal structure of the bus switch in this state is identical with the internal structure of FIG. 8.

Upon determination that the write address WA is higher than the address indicated by the address pointer AP2 (step S240: no), on the other hand, the flash controller 130 subsequently determines whether the write address WA is lower than the last address An of the first flash memory FL1 (step S260). Upon determination that the write address WA is lower than the address An (step S260: yes), it means that the write address WA is located in a range between the address indicated by the address pointer AP2 and the address An. In this state, since the address indicated by the address pointer AP2 is lower than the address An, it is determinable that the current operating status is the space priority mode and that there is no ECC data at the corresponding address in the second flash memory FL2 corresponding to the write address WA in the first flash memory FL1 (see FIG. 3). The flash controller 130 accordingly writes the writing data at the write address WA in the first flash memory FL1 without writing ECC data into the second flash memory FL2 (step S270).

Figure 9:
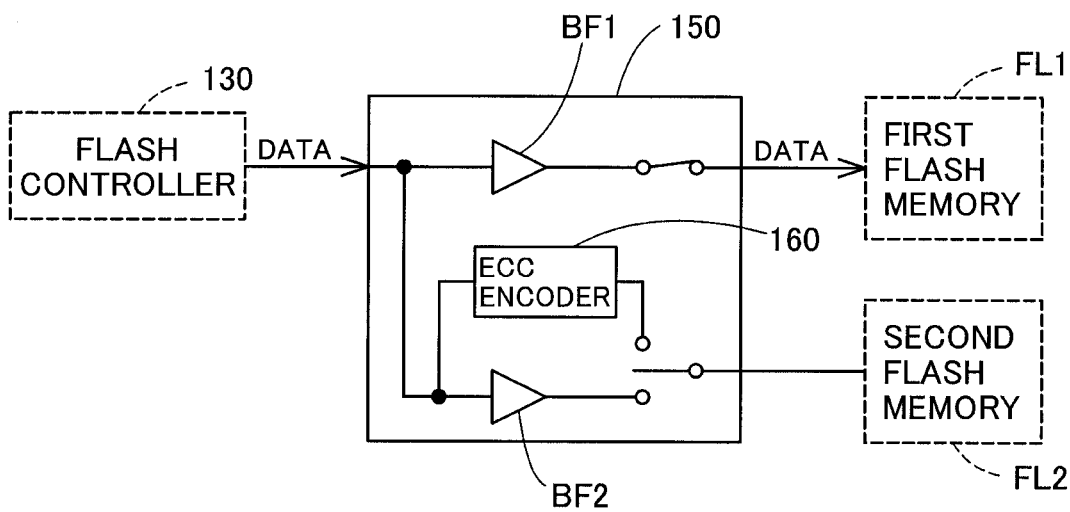
FIG. 9 is an explanatory view showing another internal structure of the bus switch.

FIG. 9 is an explanatory view showing the internal structure of the bus switch 150 in the state of data writing at step S270. In this state, the bus switch 150 connects the flash controller 130 with an internal buffer BF1 and connects the buffer BF1 with the first flash memory FL1, while not connecting the flash controller 130 with the second flash memory FL2. This internal structure of the bus switch 150 enables the writing data to be written only into the first flash memory FL1.

Upon determination that the write address WA is higher than the last address An of the first flash memory FL1 and represents an address in the second flash memory FL2 (step S260: no), the flash controller 130 subsequently determines whether the write address WA is higher than the address indicated by the address pointer AP3 (step S280). Upon determination that the write address WA is higher than the address indicated by the address pointer AP3 (step S280: yes), it is determinable that the command received from the host is a write command into the storage area for ECC data in the second flash memory FL2 (see FIG. 4). The flash controller 130 then deletes data in a range between the address indicated by the address pointer AP3 and the write address WA (step S290), and resets the write address WA to the value of the address pointer AP3 and an address '2An-WA' to the value of the address pointer AP2 (step S300). The flash controller 130 subsequently writes the writing data at the write address WA in the second flash memory FL2 (step S310). When the value of the address pointer AP3 exceeds the address (An+1) for the first time at step S300, the operating status of the data storage apparatus 10 is changed over from the data security mode to the space priority mode.

Figure 10:
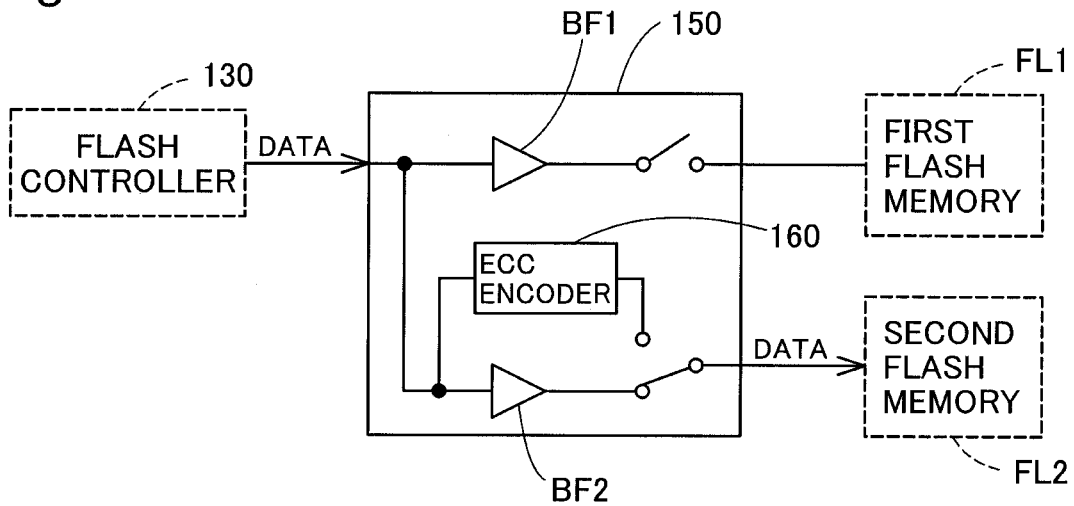
FIG. 10 is an explanatory view showing still another internal structure of the bus switch.

FIG. 10 is an explanatory view showing the internal structure of the bus switch 150 in the state of writing data at step S310. In this state, the bus switch 150 connects the flash controller 130 with an internal buffer BF2 and connects the buffer BF2 with the second flash memory FL2, while not connecting the flash controller 130 with the first flash memory FL1. This internal structure of the bus switch 150 enables the writing data to be written only into the second flash memory FL2.

Upon determination that the write address WA is lower than the address indicated by the address pointer AP3 (step S280: no), it is determinable that the write address WA is located in the storage area for the ordinary data in the second flash memory FL2. The flash controller 130 accordingly writes the writing address at the write address WA in the second flash memory FL2 (equivalent to a real address (2Bn-WA) in an address range of B5 to Bn in FIG. 3) (step S310) without deleting the ECC data. The internal structure of the bus switch 150 in this state is identical with the internal structure of FIG. 10.

As described above, the write process sequentially compares the write address WA with the addresses including those indicated by the address pointers AP1 to AP3 and enables data to be written adequately according to the current operating status of the data storage apparatus 10.

(C4) Read Process

Figure 11:
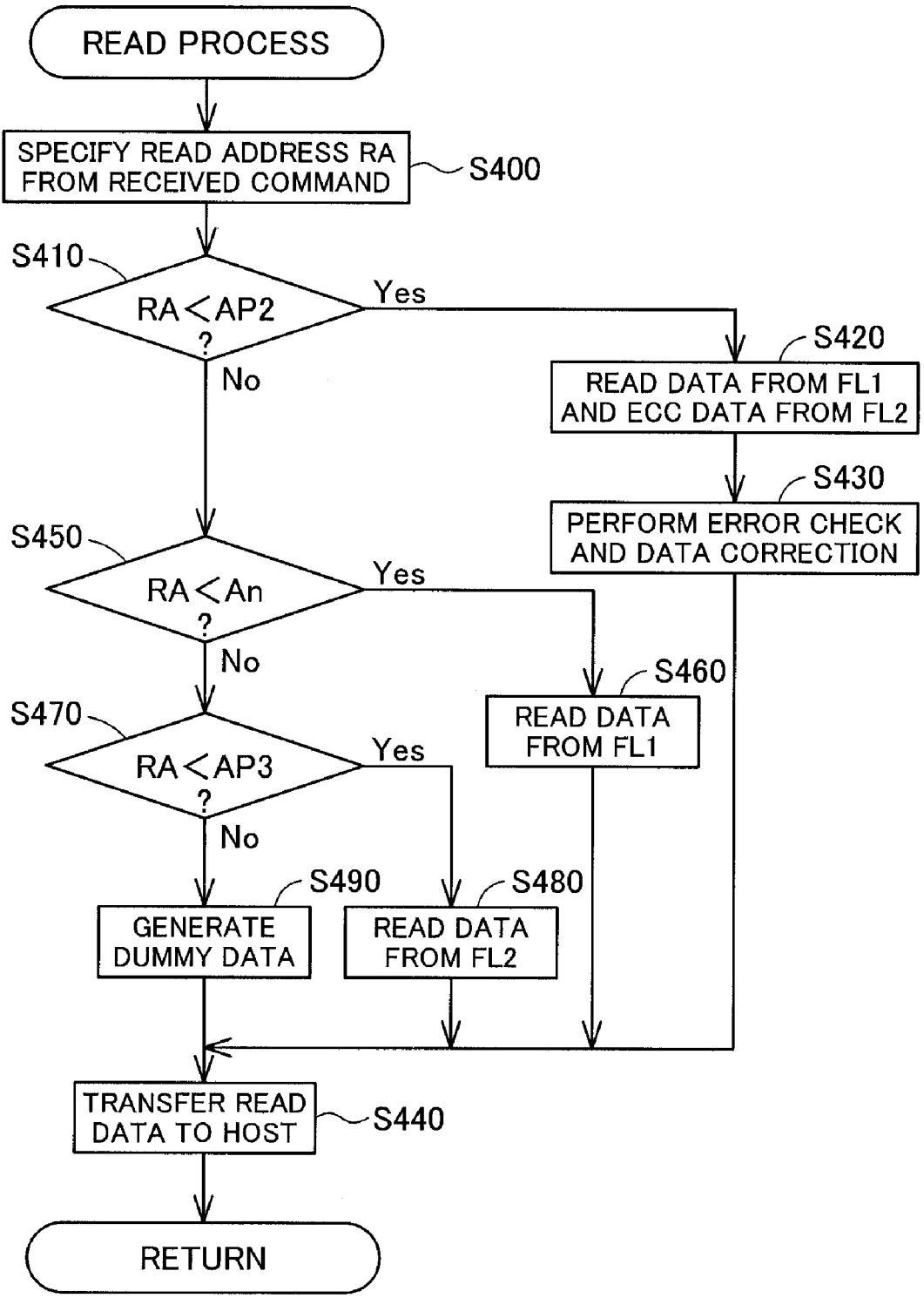
FIG. 11 is a flowchart showing a read process.

FIG. 11 is a flowchart showing the read process executed at step S50 in the main process routine explained above. The read process is performed to read data from the flash memory in response to a read command from the host.

In the read process, the flash controller 130 first analyzes a read command received from the host via the USB control circuit 120 and specifies an address of a reading source (hereafter referred to as 'read address RA') (step S400).

The flash controller 130 subsequently refers to the storage in the register 145 and determines whether the specified read address RA is lower than the address indicated by the address pointer AP2 (step S410). Upon determination that the read address RA is lower than the address indicated by the address pointer AP2 (step 410: yes), it means that ECC data is present at a corresponding address in the second flash memory FL2 corresponding to the read address RA (see FIG. 3). The flash controller 130 accordingly reads data from the read address RA in the first flash memory FL1, while reading ECC data from the corresponding read address RA (real address) in the second flash memory FL2 (step S420). As the flash controller 130 reads the ordinary data and the ECC data, the ECC decoder 170 in the bus switch 150 performs error check and data correction (step S430). On completion of the error check and the data correction, the flash controller 130 transfers the read data to the host via the USB control circuit 120 (step S440).

Figure 12:
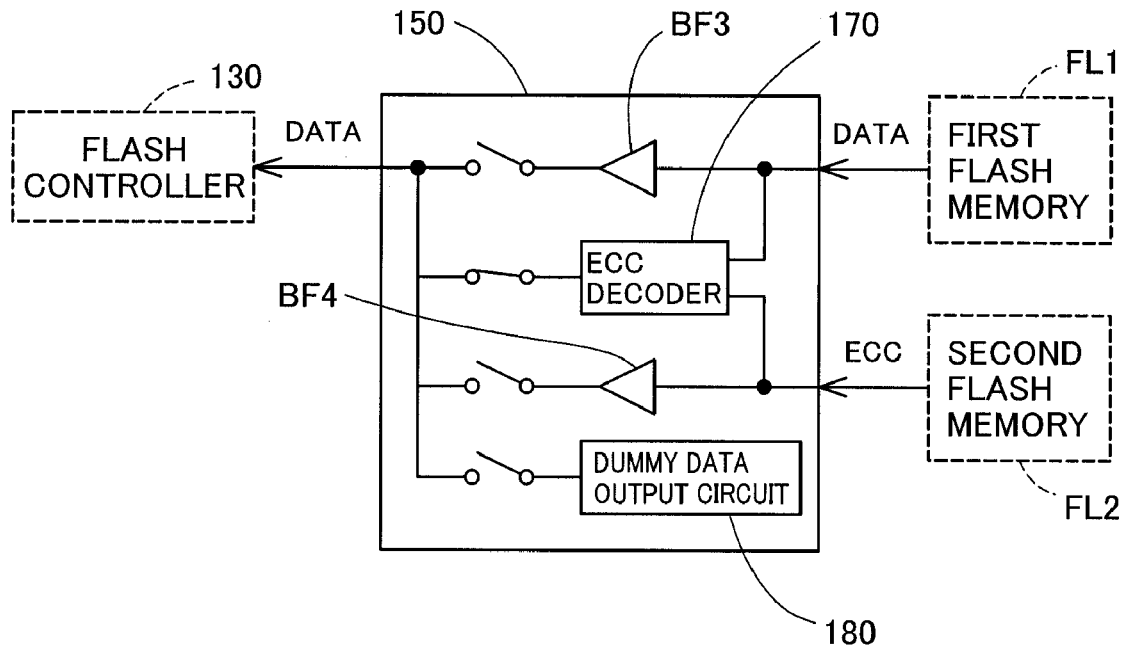
FIG. 12 is an explanatory view showing an internal structure of the bus switch.

FIG. 12 is an explanatory view showing the internal structure of the bus switch 150 in the state of reading data at step S420. In this state, the bus switch 150 connects the flash controller 130 with the internal ECC decoder 170, while connecting both the first flash memory FL1 and the second flash memory FL2 with the internal ECC decoder 170. This internal structure of the bus switch 150 enables the ECC decoder 170 to perform error check and data correction, based on the data read from the first flash memory FL1 and the ECC data read from the second flash memory FL2. In response to detection of no error or in response to successful data correction, the error-free data or the corrected data is output to the host via the flash controller 130. In response to detection of an error and failed data correction, the host is notified of the error detection or the failed data correction by the flash controller 130.

Upon determination that the read address RA is higher than the address indicated by the address pointer AP2 (step S410: no), on the other hand, the flash controller 130 subsequently determines whether the read address RA is lower than the last address An of the first flash memory FL1 (step S450). Upon determination that the read address RA is lower than the address An (step S450: yes), it means that the read address RA is located in a range between the address indicated by the address pointer AP2 and the address An. In this state, since the address indicated by the address pointer AP2 is lower than the address An, it is determinable that the current operating status is the space priority mode and that there is no ECC data at the corresponding address in the second flash memory FL2 corresponding to the read address RA in the first flash memory FL1 (see FIG. 3). The flash controller 130 accordingly reads data from only the read address RA in the first flash memory FL1 (step S460) and transfers the read data to the host (step S440).

Figure 13:
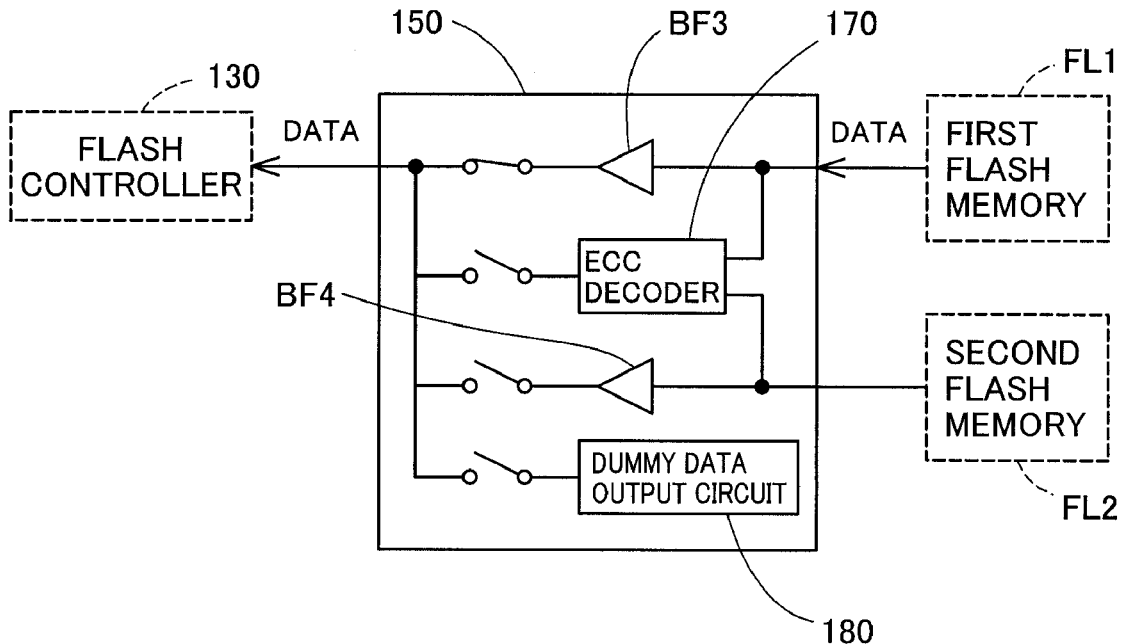
FIG. 13 is an explanatory view showing another internal structure of the bus switch.

FIG. 13 is an explanatory view showing the internal structure of the bus switch 150 in the state of reading data at step S460. In this state, the bus switch 150 connects the flash controller 130 with an internal buffer BF3 and connects the buffer BF3 with the first flash memory FL1, while not connecting the flash controller 130 with the second flash memory FL2. This internal structure of the bus switch 150 enables data to be read from only the first flash memory FL1.

Upon determination that the read address RA is higher than the last address An of the first flash memory FL1 and represents an address in the second flash memory FL2 (step S450: no), the flash controller 130 subsequently determines whether the read address RA is lower than the address indicated by the address pointer AP3 (step S470). Upon determination that the read address RA is lower than the address indicated by the address pointer AP3 (step S470: yes), it is determinable that the command received from the host is a read command from the storage area for the ordinary data in the second flash memory FL2 (see FIGS. 3 and 4). The flash controller 130 then reads data from the read address RA in the second flash memory FL2 (step S480) and transfers the read data to the host (step S440).

Figure 14:
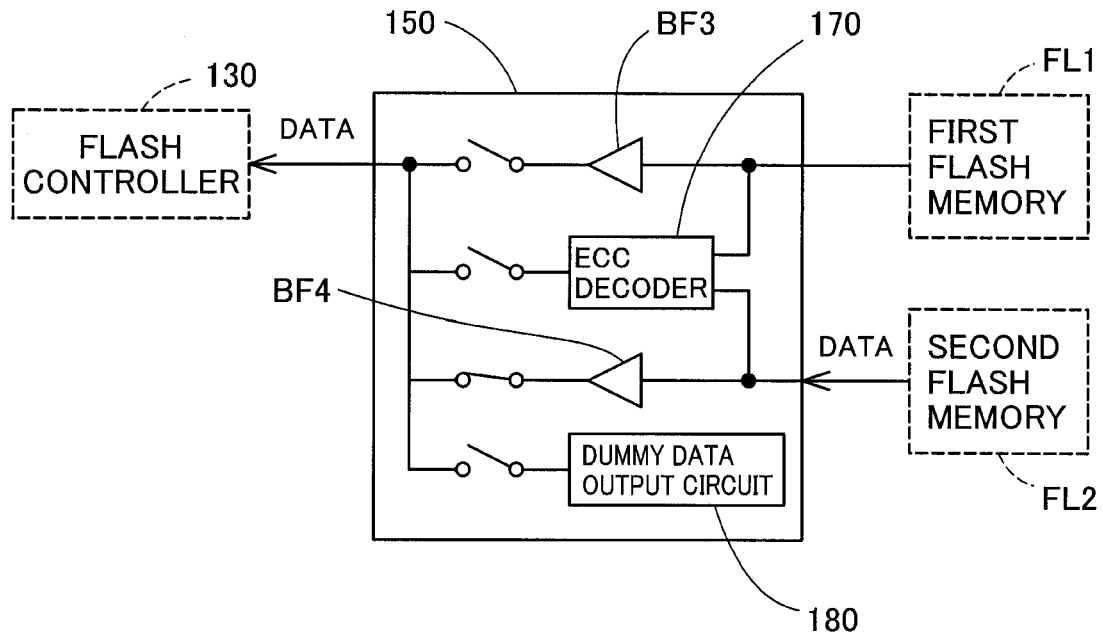
FIG. 14 is an explanatory view showing still another internal structure of the bus switch.

FIG. 14 is an explanatory view showing the internal structure of the bus switch 150 in the state of reading data at step S480. In this state, the bus switch 150 connects the flash controller 130 with an internal buffer BF4 and connects the buffer BF4 with the second flash memory FL2, while not connecting the flash controller 130 with the first flash memory FL1. This internal structure of the bus switch 150 enables data to be read from only the second flash memory FL2.

Upon determination that the read address RA is higher than the address indicated by the address pointer AP3 (step S470: no), it is determinable that the command received from the host is a read command from the storage area for the ECC data in the second flash memory FL2 (see FIG. 4). In the space priority mode, this storage area is required to be recognized as a non-use area by the host. The flash controller 130 accordingly controls the dummy data output circuit 180 in the bus switch 150 to generate dummy data '00' (step S490) and transfers the generated dummy data to the host (step S440). This causes the host to recognize no data storage in this storage area. The dummy data is not restricted to '00' but may be any other suitable data, for example, 'FF', 'AA', or '55'.

Figure 15:
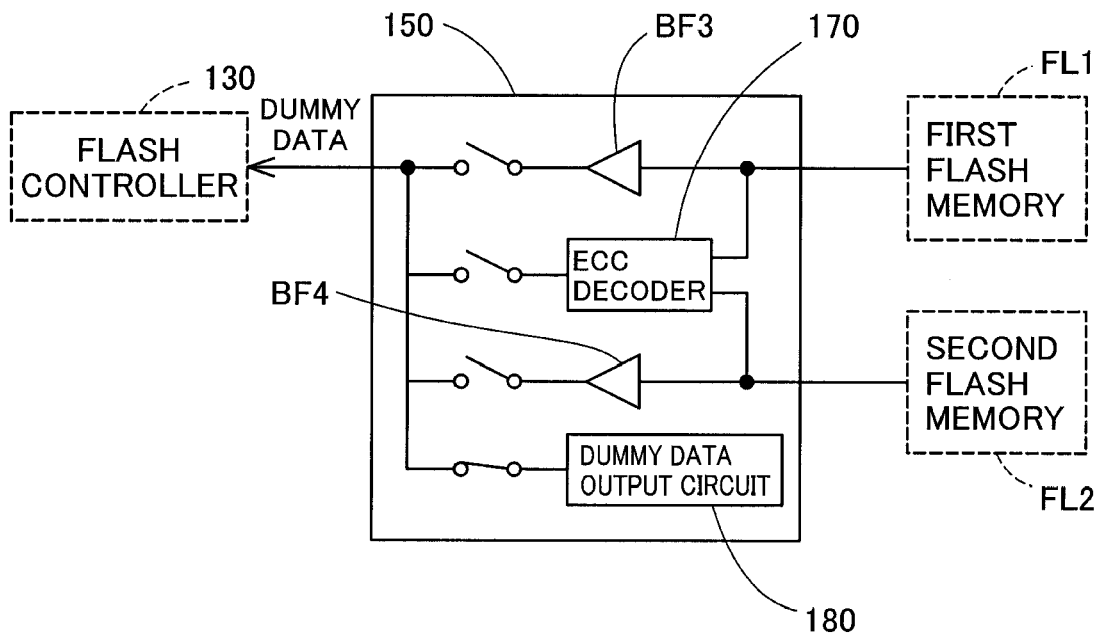
FIG. 15 is an explanatory view showing another internal structure of the bus switch.

FIG. 15 is an explanatory view showing the internal structure of the bus switch 150 in the state of reading dummy data at step S490. In this state, the bus switch 150 connects the internal dummy data output circuit 180 with the flash controller 130, while connecting neither the first flash memory FL1 nor the second flash memory FL2 with the flash controller 130. This internal structure of the bus switch 150 enables only the dummy data to be read from the dummy data output circuit 180.

As described above, the read process sequentially compares the read address RA with the addresses including those indicated by the address pointers AP2 and AP3 and enables the ordinary data and the ECC data to be read from the appropriate storage area according to the current operating status of the data storage apparatus 10.

D. Effects

The data storage apparatus 10 of the embodiment has the configuration and the operations described above. As long as there is a remaining storage space in the first flash memory FL1, the data storage apparatus 10 of the embodiment writes ordinary data as an object of a write command given by the host into the first flash memory FL1, while writing ECC data used for correction of the ordinary data into the second flash memory FL2. Even in the event of a damage of the ordinary data written in the first flash memory FL2 by any reason, the ECC data written in the second flash memory FL2 is used to correct the damaged data.

When there is no remaining storage space in the first flash memory FL1, the data storage apparatus 10 of the embodiment deletes the existing ECC data previously written in the second flash memory FL2 and writes the data transferred from the host into the second flash memory FL2. This arrangement enables the effective use of the storage space in the data storage apparatus 10 equipped with the two flash memories. The embodiment provides the functional data storage apparatus by balancing the data reliability and the effective use of the storage space.

E. Modifications

The embodiment discussed above is to be considered in all aspects as illustrative and not restrictive. There may be many modifications, changes, and alterations without departing from the scope or spirit of the main characteristics of the present invention. For example, the functions by the hardware configuration may be actualized by the software configuration. Some examples of possible modification are given below.

(E1) Modification 1

In the configuration of the embodiment, the ECC data is recorded into the second flash memory FL2 in the data security mode. In one modification, the same data as those written in the first flash memory FL1 may alternatively be written into the second flash memory FL2. The modified arrangement enhances the redundancy of data and thus improves the fault tolerance. This modified arrangement enables error check by simple comparison between the two data recorded in the two flash memories, thus relieving the processing load of the data storage apparatus 10.

In this modified arrangement, ECC data normally recorded in each flash memory is used to identify the normality between the data recorded in the first flash memory FL1 and the data recorded in the second flash memory FL2. In a data storage apparatus equipped with a general-purpose flash controller and NAND flash memories, 64-byte ECC data is normally recorded with respect to 2048-byte data in each flash memory. This ECC data is used to check the error of the data recorded in each flash memory. The data output from the error-free flash memory is transferred to the host. This arrangement ensures output of normal data.

The modified arrangement writes the same data as those written in the first flash memory FL1 into the second flash memory FL2. This is, however, not essential. Data of inverse bits to the bits of the data written in the first flash memory FL1 may be written into the second flash memory FL2.

(E2) Modification 2

The embodiment uses the address pointers to discriminate the user data area DA from the management area MA in the flash memory or to discriminate the storage area for the ordinary data from the storage area for the ECC data. In one modification, a table may be used to manage data storage or no data storage at individual addresses in the flash memory.

Figure 16:
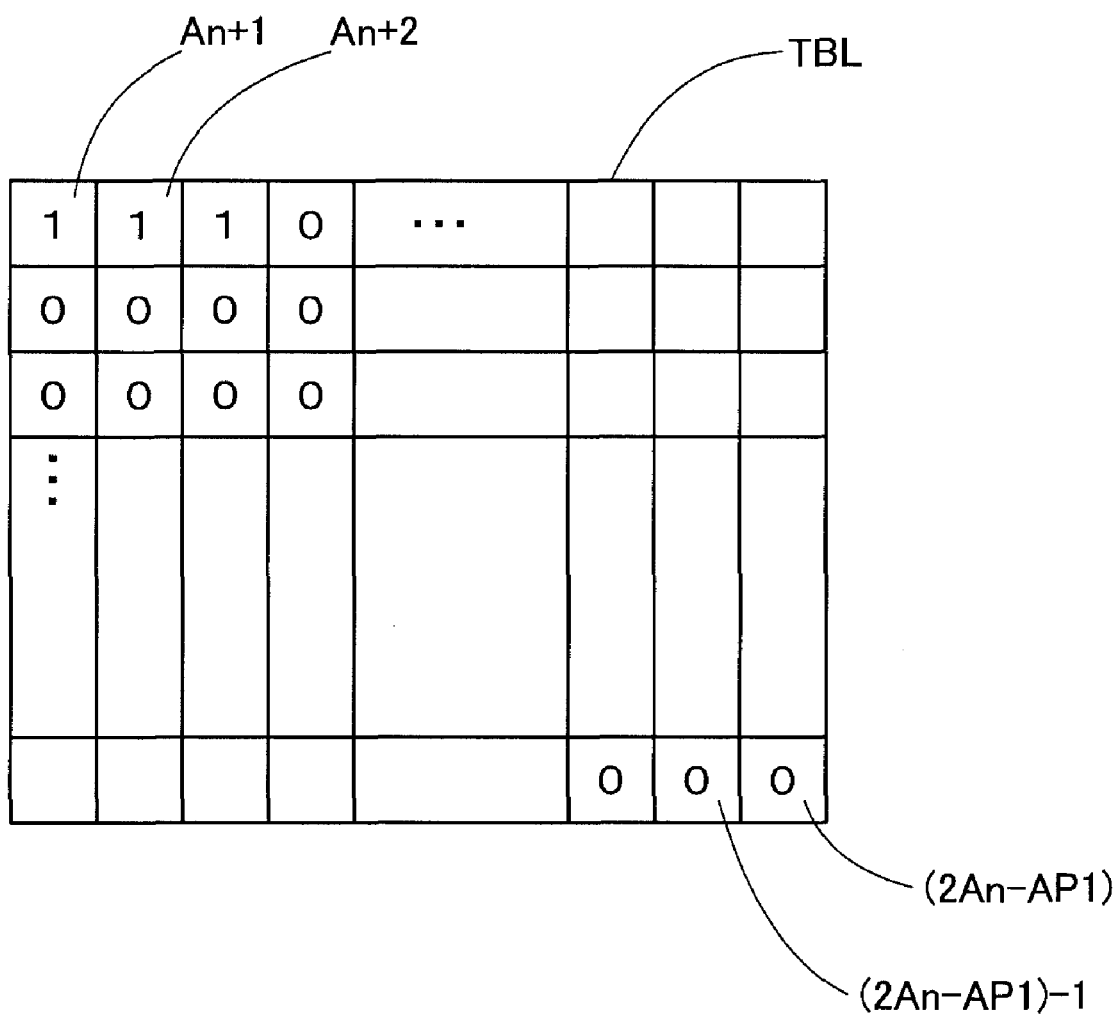
FIG. 16 is an explanatory view showing one example of a table representing a data storage status in a second flash memory.

FIG. 16 shows one example of a table TBL representing a data storage status in the second flash memory FL2. In the table TBL, a 1-bit space is allocated to each address in the range of the virtual address (An+1) to the virtual address (2An-AP1) in the second flash memory FL2 shown in FIG. 4. The bit status of each bit represents data storage or no data storage at an address corresponding to the bit. The bit status '1' represents data storage, while the bit status '0' represents no data storage.

In the data security mode of writing ECC data in the second flash memory FL2, the flash controller 130 does not change the settings in the table TBL. Namely each bit of the table TBL is kept '0' in the data security mode.

In the space priority mode of writing ordinary data in the second flash memory FL2, on the other hand, as data is written at a write address in the second flash memory FL2, a corresponding bit in the table TBL corresponding to the write address is set to '1'. Such setting readily identifies which address in the second flash memory FL2 has data storage.

The flash controller 130 refers to the bit statuses in the table TBL and readily determines whether ECC data is to be written into the second flash memory FL2 or ECC data is to be read out of the second flash memory FL2. For example, in the process of writing data in the first flash memory FL1, the bit status '1' of a certain bit in the table TBL allocated to a corresponding address in the second flash memory FL2 corresponding to a write address in the first flash memory FL1 determines that ordinary data has already been recorded at the corresponding address in the second flash memory FL2. In this case, data is written into only the first flash memory FL1. In another example, in the process of writing data in the first flash memory FL1, the bit status '0' of a certain bit in the table TBL allocated to a corresponding address in the second flash memory FL2 corresponding to a write address in the first flash memory FL1 determines that no ordinary data has been recorded at the corresponding address in the second flash memory FL2. In this case, ECC data is written into the second flash memory FL2, while ordinary data is written into the first flash memory FL1.

This Modification uses the table TBL to manage the data storage in the second flash memory FL2. Even in the use state of writing data of small capacity at random addresses, this arrangement enables ordinary data and ECC data to be adequately read out and written in.

(E3) Modification 3

In the embodiment described above, when the remaining storage space of the first flash memory FL1 reaches 0, the operating status of the data storage apparatus 10 is automatically changed over from the data security mode to the space priority mode. The data storage apparatus 10 of one modified structure may be equipped with a mode changeover switch. The operating status of the data storage apparatus 10 is changed over according to the setting of this mode changeover switch. This modified structure enables the user to flexibly set the operating status according to the application of the data storage apparatus 10. For example, with a view to storing data of great importance, writing ordinary data into the second flash memory FL2 is prohibited to forcibly set the operating status of the data storage apparatus 10 to the data security mode. With a view to storing data of large capacity, the operating status of the data storage apparatus 10 is forcibly set to the space priority mode. In the default state, the data storage apparatus 10 is forcibly set to the data security mode for the enhanced reliability of data.

The operating status may be set by the software configuration, instead of the operation of the physical switch. One method of setting the operating status by the software configuration installs an exclusive application program for the mode changeover in the host. The application program outputs a mode changeover command to the data storage apparatus 10. The flash controller 130 or the USB control circuit 120 then analyzes the command and changes over the operating status.

(E4) Modification 4

In the embodiment described above, the data written in the first flash memory FL1 and the ECC data written in the second flash memory FL2 are assumed to have equivalent data capacities. The first flash memory FL1 and the second flash memory FL2 accordingly have identical storage spaces. The storage space required for the second flash memory FL2 is, however, actually varied according to the size of the ECC data. The first flash memory FL1 and the second flash memory FL2 may accordingly have different storage spaces. For example, when the ECC data written in the second flash memory FL2 has the shorter data length than the data written in the first flash memory FL1, the storage space of the second flash memory FL2 may be less than the storage space of the first flash memory FL1.

Even when the data written in the first flash memory FL1 and the ECC data written in the second flash memory FL2 have an identical data length, the second flash memory FL2 may be structured to have a greater storage space. During the operation of the data storage apparatus 10 in the data security mode, the greater storage space of the second flash memory FL2 is not effectively utilized. In the space priority mode, however, the greater storage space of the second flash memory FL2 desirably increases the total storage space of the data storage apparatus 10.

(E5) Modification 5

In the embodiment described above, in the space priority mode, address management is performed to connect the last real address of the first flash memory FL1 with the last real address of the second flash memory FL2 as shown in FIG. 4. In one modification, address management may be performed to connect the last real address of the first flash memory FL1 with a head real address in the user data area of the second flash memory FL2. In this modified structure, in the changeover of the operating status to the space priority mode, the ECC data is deleted from the second flash memory FL2 in the first-in first-out order.

(E6) Modification 6

The embodiment does not specifically mention a return of the operating status of the data storage apparatus 10 to the data security mode after a changeover from the data security mode to the space priority mode. The operating status of the data storage apparatus 10 may be returned to the data security mode according to the following procedure. After the changeover of the operating status to the space priority mode, when the total capacity of the stored data is reduced to or below the storage space of the user data area DA in the first flash memory FL1 by deletion of data from the first flash memory FL1 or the second flash memory FL2, defragmentation is performed to shift all the data to the user data area in the first flash memory FL1. ECC data is then generated from the individual data shifted to the first flash memory FL1 and is recorded in the second flash memory FL2. This series of operations enables the operating status to be returned from the space priority mode to the data security mode. This series of operations may be performed automatically when the total capacity of the stored data is reduced to or below the storage space of the user data area in the first flash memory FL1 or may be performed in response to an operation of a physical switch provided on the data storage apparatus 10 or in response to an operation by an exclusive application program installed in the host.

(E7) Modification 7

In the embodiment described above, even in the operating status of the data storage apparatus 10 set to the space priority mode, as long as the second flash memory FL2 has the existing ECC data, the error check and data correction are performed with the existing ECC data. In one modification, in the changeover of the operating status to the space priority mode, the existing ECC data in the second flash memory FL2 may be all deleted or may be treated as non-existent. This modified arrangement does not require the detection of the existing ECC data in the second flash memory FL2, thus relieving the processing load and improving the data read and data write speeds.

(E8) Modification 8

The data storage apparatus 10 of the embodiment uses the flash memory as the storage unit. The flash memory is, however, neither essential nor restrictive but may be replaced by any other suitable storage device, for example, a hard disk drive or a rewritable optical disk. The data storage apparatus 10 of the embodiment has the two flash memories. This number of flash memories is, however, neither essential nor restrictive, but the data storage apparatus may be equipped with any even number of flash memories. The series of processing explained in the embodiment may be performed with regard to each pair of flash memories. The data storage apparatus 10 of the embodiment uses the physically separate two flash memories. In one modification, the storage space in one flash memory may be divided into two storage areas. One of the two storage areas may be treated as the first flash memory FL1 of the embodiment, while the other storage area may be treated as the second flash memory FL2 of the embodiment.

(E9) Modification 9

The data storage apparatus 10 of the embodiment is formatted according to the FAT file system. The FAT file system is, however, neither essential nor restrictive, but any other suitable file system, for example, NTFS, HPFS, or Linux (registered trademark) EXT, may be adopted for formatting the data storage apparatus 10.

In the description of the embodiment, the data storage location in the first flash memory FL1 and the second flash memory FL2 is expressed by the terminology 'address'. This term 'address' is, however, not restrictive but is replaceable with any of equivalent terms, for example, 'sector', 'cluster', 'block', or 'block address' according to the file system, the operating system, or the storage unit adopted.

None of the embodiment, its modifications, and its applications described above is to be interpreted in a restrictive manner. The scope and spirit of the present invention are indicated by the appended claims, rather than by the foregoing description.

The invention claimed is:

1. A data storage apparatus that stores data transferred from a host device, the data storage apparatus comprising:
   a first memory unit that has a predetermined storage area;
   a second memory unit that has a predetermined storage area;
   a monitoring unit that monitors at least a use area in the first memory unit; and a write control unit that, in response to detection of a remaining storage space in the storage area of the first memory unit by the monitoring unit, writes the data transferred from the host device into the first memory unit and writes correction data used for correction of the data into the second memory unit, and in response to detection of no remaining storage space in the storage area of the first memory unit by the monitoring unit, deletes existing correction data previously stored in the second memory unit and writes the data into the second memory unit.

2. The data storage apparatus in accordance with claim 1, wherein the write control unit further comprises an encode unit that generates an error correction code, based on the data transferred from the host device, as the correction data.

3. The data storage apparatus in accordance with claim 2, wherein the encode unit generates the error correction code having an equal number or a less number of bits to or than a number of bits of the data transferred from the host device.

4. The data storage apparatus in accordance with claim 1, wherein the write control unit generates either identical data with the data transferred from the host device or inverse data having inverted bits to bits of the data transferred from the host device, as the correction data.

5. The data storage apparatus in accordance with claim 1, wherein the write control unit writes the data transferred from the host device into the second memory unit according to a virtual address space, which is provided by connecting a physical last address of the first memory unit with a physical last address of the second memory unit.

6. The data storage apparatus in accordance with claim 1, the data storage apparatus further comprising:
a read control unit that, in response to a data read request from the host device, when a storage location of target data as an object of the data read request is the first memory unit and corresponding correction data generated from the target data is present in the second memory unit, reads the target data from the first memory unit and the corresponding correction data from the second memory unit, corrects the target data with the corresponding correction data, and transfers the corrected target data to the host device.

7. The data storage apparatus in accordance with claim 6, wherein when the storage location of the target data as the object of the data read request is the first memory unit and the corresponding correction data generated from the target data is not present in the second memory unit, the read control unit reads the target data from the first memory unit and directly transfers the read target data to the host device.

8. The data storage apparatus in accordance with claim 6, wherein when the storage location of the target data as the object of the data read request is a storage area for ordinary data in the second memory unit, the read control unit reads the target data from the second memory unit and directly transfers the read target data to the host device.

9. The data storage apparatus in accordance with claim 6, wherein when the storage location of the target data as the object of the data read request is a storage area for the correction data in the second memory unit, the read control unit transfers prescribed data as dummy data to the host device without reading data from the second memory unit.

10. The data storage apparatus in accordance with claim 6, wherein the write control unit stores an address pointer representing a maximum address for writing the data, when the data transferred from the host device is written into the second memory unit, and
the read control unit refers to the address pointer and determines whether correction data corresponding to the target data as the object of the data read request is present in the second memory unit or whether the storage location of the target data as the object of the data read request is a storage area for the correction data in the second memory unit.

11. The data storage apparatus in accordance with claim 6, wherein the write control unit stores a prescribed table representing a data writing status at each address in the second memory unit, when the data transferred from the host device is written into the second memory unit, and
the read control unit refers to the stored table and determines whether correction data corresponding to the target data as the object of the data read request is present in the second memory unit or whether the storage location of the target data as the object of the data read request is a storage area for the correction data in the second memory unit.

12. The data storage apparatus in accordance with claim 1, the data storage apparatus further comprising:
a unit that inhibits the write control unit from writing ordinary data into the second memory unit in response to a predetermined setting operation, whether there is a remaining storage space or no remaining storage space in the storage area of the first memory unit.

13. The data storage apparatus in accordance with claim 1, wherein the first memory unit and the second memory unit have identical storage spaces.

14. The data storage apparatus in accordance with claim 1, wherein the data is transferred from the host device via a USB interface.

15. The data storage apparatus in accordance with claim 1, wherein each of the first memory unit and the second memory unit is a non-volatile semiconductor memory.

16. The data storage apparatus in accordance with claim 15, wherein the non-volatile semiconductor memory is a flash memory.

17. A data storage method of storing data transferred from a host device into a data storage apparatus, which is equipped with a first memory unit that has a predetermined storage area and a second memory unit that has a predetermined storage area,
the data storage method comprising:
monitoring at least a use area in the first memory unit;
in response to detection of a remaining storage space in the storage area of the first memory unit as a result of the monitoring, writing the data transferred from the host device into the first memory unit and writing correction data used for correction of the data into the second memory unit; and
in response to detection of no remaining storage space in the storage area of the first memory unit as a result of the monitoring, deleting existing correction data previously stored in the second memory unit and writing the data into the second memory unit.

* * * * *